US006995777B2

(12) United States Patent
Sanborn et al.

(10) Patent No.: US 6,995,777 B2
(45) Date of Patent: *Feb. 7, 2006

(54) SYSTEM AND METHOD FOR PROVIDING VECTOR EDITING OF BITMAP IMAGES

(76) Inventors: Frank G. Sanborn, 9731 Fremont Ave. N., Seattle, WA (US) 98103; Michael I Hyman, 5206 Beach Dr. SW., Seattle, WA (US) 98136; Ramin L. Halviatti, 11207 NE. 95th St., Kirkland, WA (US) 98033; Ahmed M. Azmy Hassan, 817 141st Pl. SE., Bellevue, WA (US) 98007

( * ) Notice: Subject to any disclaimer, the term of this patent is extended or adjusted under 35 U.S.C. 154(b) by 58 days.

This patent is subject to a terminal disclaimer.

(21) Appl. No.: 11/009,736

(22) Filed: Dec. 10, 2004

(65) Prior Publication Data

US 2005/0146533 A1    Jul. 7, 2005

Related U.S. Application Data

(63) Continuation of application No. 09/587,765, filed on Jun. 6, 2000.

(51) Int. Cl.
*G09G 5/00* (2006.01)
*G06K 9/40* (2006.01)

(52) U.S. Cl. ........................ 345/619; 345/630; 345/536; 382/260; 715/700

(58) Field of Classification Search ........ 345/618–619, 345/629–630, 581, 654, 536–537, 545–548; 715/700, 763, 839, 853, 513, 500, 502, 530–531; 382/197, 203, 210, 213, 260
See application file for complete search history.

(56) References Cited

U.S. PATENT DOCUMENTS

| 5,490,246 | A | * | 2/1996 | Brotsky et al. ............. 715/763 |
| 6,076,104 | A | | 6/2000 | McCue |
| 6,169,545 | B1 | | 1/2001 | Gallery et al. |

(Continued)

*Primary Examiner*—Matthew C. Bella
*Assistant Examiner*—Wesner Sajous
(74) *Attorney, Agent, or Firm*—Lee & Hayes, PLLC

(57) ABSTRACT

A method of supporting all raster-based image manipulations described in vector-based terms. The present invention has the benefits of providing clean transformation that vector-based manipulations yields, and providing a broad selection of all image transformation operations that raster-based manipulations yield. In one aspect of the invention a vector-defined shape is drawn on top of a raster-based image by replacing the contents of the vector image with the bits from the raster image. In another aspect of the present invention, a copy of the portion of the raster image that overlaps with the vector-defined portion is made, the transformation operation is performed on the copy, and then the portion of the raster image is replaced with the transformed copy. In yet another aspect of the present invention, a filter, such as a transformation operation, is attached to a textual vector instruction, the bits defined by the textual vector instruction are replaced with the corresponding bits in a raster image, and the transformation is applied. In still another aspect of the present invention, a browser receives a HTML page, in which the HTML page identifies a custom plug-in extension method to the browser, a background image, a vector shape, and a raster manipulation, the browser communicates the information in the HTML page to the custom plug-in extension component, and the component uses an input buffer, and an output buffer coupled to the browser to perform the raster manipulation on the vector shape and background image.

20 Claims, 11 Drawing Sheets

U.S. PATENT DOCUMENTS

| | | |
|---|---|---|
| 6,223,213 B1 | 4/2001 | Cleron et al. |
| 6,253,238 B1 | 6/2001 | Lauder et al. |
| 6,324,300 B1 * | 11/2001 | Doll ......................... 382/162 |
| 6,384,821 B1 | 5/2002 | Borrel et al. |
| 6,460,075 B2 | 10/2002 | Krueger et al. |
| 6,462,754 B1 | 10/2002 | Chakraborty et al. |
| 6,611,531 B1 | 8/2003 | Chen et al. |
| 6,665,835 B1 | 12/2003 | Gutfreund et al. |
| 6,675,386 B1 | 1/2004 | Hendricks et al. |
| 6,697,564 B1 | 2/2004 | Toklu et al. |
| 6,870,545 B1 * | 3/2005 | Smith et al. ................ 345/619 |
| 2001/0033284 A1 * | 10/2001 | Chan ......................... 345/441 |
| 2001/0056575 A1 * | 12/2001 | Wei et al. ..................... 725/41 |
| 2002/0033837 A1 * | 3/2002 | Munro ...................... 345/654 |

* cited by examiner

SYSTEM AND METHOD FOR PROVIDING VECTOR EDITING OF BITMAP IMAGES

RELATED APPLICATIONS

This application is related to copending U.S. application Ser. No. 09/594,303, filed May 31, 2000 entitled "SYSTEM AND METHOD FOR USING A STANDARD COMPOSITION ENVIRONMENT AS THE COMPOSITION SPACE FOR IMAGE EDITING."

This application is a continuation of, and claims priority to, U.S. patent application Ser. No. 09/587,765, filed Jun. 6, 2000 entitled "System and method for using a standard composition environment as the composition space for video image editing", which is hereby incorporated by reference.

FIELD OF THE INVENTION

This invention relates generally to image editing, and more particularly to performing vector transformations of raster-images.

COPYRIGHT NOTICE/PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Microsoft Corporation, All Rights Reserved.

BACKGROUND OF THE INVENTION

There are two conventional drawing techniques: vector-based and raster-based.

Vector-based drawing provides for clean scaling, rotation, and grouping without any loss of information. Vector drawing is performed by drawing geometric shapes from shape descriptions. The underlying storage is a shape description. Vector drawings can be manipulated after they are drawn to move mad resize individual elements. The shape can be 30 scaled, rotated and/or undone without losing any information. Vector drawing is generally used for creating illustrations. Examples of vector drawing include flow charts and Visio and PowerPoint style diagrams. However, vector transformations are limited in their scope and flexibility.

In contrast, raster drawing is done by modifying or transforming a bitmap. The underlying storage is a set of bits. Raster drawing is performed by modifying and/or transforming a bitmap, such as darkening, blurring, sharpening and red-eye removal. However, information is lost during modification and/or transformation because the image is distorted. Raster transformations are destructive, because the changes are made in place on the image by directly modifying the values of the individual pixels. Raster techniques are used for creating and manipulating illustrations. Raster drawing provides photorealism.

In general, the vector and raster techniques are mutually exclusive. The two techniques of raster and vector drawing are generally not used in combination because vector drawing allows for no loss of information during raster transformation. Therefore, many of the raster transformations, such as darkening, blurring, sharpening and red-eye removal are not available for use in the vector technique.

Furthermore, conventional browsers contain a technology for rendering vector images called vector markup language (VML) or Scalable Vector Graphics (SVG). Vectors are described textually using the VML or SVG formats and then drawn in a browser.

Conventional image editing methods do not enable vector and raster imaging to be combined. One conventional image editing method uses a technique called masking, which is also named transparency layer. The transparency mask (or layer) is a gray scale raster image (as a separate image or an additional color channel added to the image being edited) with the size of the original image that is being edited. The specific area of the edited image that is required to be affected is described by using the corresponding area on the transparency layer by setting the pixel value of the transparency layer to the maximum value and areas not affected to the minimum value. Setting a pixel value on the transparency layer to a value between the maximum and minimum can indicate a percentage effect (the closer to the maximum value the closer the effect to the maximum effect). It should be noted that the transparency layer in conventional image editing methods uses a (raster) image and therefore does not have the advantages of using a (vector) layer (easy scaling, rotation moving, etc.). Furthermore, the transparency layer effect is interpreted by the editing application, and does not describe what the actual effect the transparency layer should apply to the edited image.

Conventional browsers also allow extensions to create effects and manipulate images in the browser, such as Microsoft® DirectX® Transform (DXTransforms). Other examples are Adobe PhotoShop® Plug-in® and Adobe® Premiere® filter. More specifically, each transform in DXTransforms is a set of instructions describing how to turn one or more graphic inputs into one graphic output. The inputs and output can be either 2-D bitmap images or 3-D mesh objects, depending on which transform is implemented. Many transforms are gradual transitions from one image to another, while others are gradual modifications of 3-D meshes. In particular, DXTransforms enable an image processing process or method to be applied to a browser element (such as an image, a chunk of text, etc.). Specifically, what occurs is that before the browser displays an object, the browser passes the bitmap to any transforms for the object, and the transforms will alter the bitmap before the bitmap is displayed. Typically such transforms are used for adding drop shadows to text, inverting images for mouse over highlights, etc. DXTransforms support chaining. That is, several transformations can be combined together.

When Microsoft® Internet® Explorer® draws a shape, it draws the shape to a buffer. Before it composes the shape with the rest of the screen, Interact Explorer checks if there are any DXTransforms attached. If so, it calls the fast DXTransform. It passes in two parameters: an input parameter, containing the shape, and an output parameter, containing the background. Although this particular handshake is how Internet Explorer operates, it is not different in technique from how other browser and composition tools operate.

In conventional DXTransforms, it is not possible to draw a vector shape on top of a bitmap because DXTransforms apply only to the image associated with the shape to which they are attached. More specifically, in conventional DXTransforms, when a transform is applied to a region defined by a shape, and a darken filter is applied, the shape and text would get darker, but not the parts of the bitmap underneath.

SUMMARY OF THE INVENTION

The above-mentioned shortcomings, disadvantages and problems are addressed by the present invention, which will be understood by reading and studying the following specification.

The present invention provides a technique to more easily create imago editing software within a browser using simple script manipulations. The present invention can be used in conjunction with the related patent application identified above.

Vector and raster image drawing techniques are used in combination in order to have clean transformation and a broad selection of all image transformation operations. More specifically, vector image drawing techniques are used to define where a transformation operation is applied to a raster image. In one aspect, the images are described in a standard display language, such as hyper text markup language (HTML), which is rendered by a browser using raster techniques, and image transformation operations are described in textual vector language, such as Vector Markup Language (VML) or Scalable Vector Graphics (SVG).

The present invention provides a unity, consistent architecture to implement all raster image manipulations in a vector-based description.

The present invention is particularly well suited for the Internet; because in one aspect, the underlying storage format for describing the images is HTML and the format describing the image manipulation operations is also textual (e.g. in VML or SVG) mad therefore are rendered natively by a browser.

Furthermore, the present invention is useful in a collaborative development environment because the entire set of manipulations that are performed are created and edited at an atomic level. For example, where one user in a collaborative environment darkened one part of a photograph and blurred another part, a second user is able to remove the darkening and keep the blur, or is able to move the darkening.

The present invention also enables transformation operations to be undone or reversed with no distortion to the original image by removing the textual vector language instructions in reverse order.

The present invention enables subsampled images (e.g. a 320×240 version of a 3200×2400 image) or portions of an image to be edited, and later the edits scaled to the larger image on the server or on a faster connection, because all of the edits are performed as vectors. Therefore, the manipulated image is viewable through any browser, without requiring the image to be rendered to a single JPG form, in which case, the individual edits are destructively applied and then lost.

In one aspect of the present invention, textual vector instructions are performed using a Microsoft® DirectX® Transform (DXTransform) command that uses a VML or SVG instruction that enables a vector-defined shape to be drawn on top of a raster-based image by replacing the contents of the vector image with the bits from the raster image. In other words, a copy of the portion of the raster image that overlaps with the vector-defined portion is made, the transformation operation is performed on the copy, and then the portion of the raster image is replaced with the transformed copy.

In another aspect of the present invention, a method of the present invention includes attaching a filter, such as a transformation operation, to a textual vector instruction, replacing the bits defined by the textual vector instruction with the corresponding bits in a raster image, and applying the transformation.

In yet another aspect of the present invention, a method includes receiving a vector shape definition, in which the definition is associated or attached with a raster-based transformation, and invoking a call to a transformation operation that performs a raster-based transformation on the vector shape definition.

In still another aspect of the present invention, a method includes drawing a shape image from a VML or SVG specification, determining that a filter is associated with the shape, copying the shape to an input buffer, copying a background image to an output buffer, retrieving a pixel from the input buffer from the pixel pointer, copying the corresponding output bit to the input buffer wherein the pixel is transparent, advancing the pixel pointer, repeating method starting with retrieving wherein more pixels in the input buffer, and copying the input buffer to the output buffer.

In still yet another aspect of the present invention, an apparatus includes a browser that receives a HTML page, in which the HTML page identifies a custom extension method to the browser, identifies a background image, identifies a vector shape, and identifies a vector manipulation. The apparatus also includes a component in communication with the browser and the custom extension method, an input buffer coupled to the browser, and an output buffer coupled to the browser.

In an alternative aspect of the present invention, a computer readable medium includes instructions for attaching a transformation component, identifying a raster image, and invoking the transformation component, in which a number of manipulations are provided to the raster image, the manipulations are described in vector-based terms.

The present invention describes systems, clients, servers, methods, and computer-readable media of varying scope. In addition to the aspects and advantages of the present invention described in this summary, further aspects and advantages of the present invention will become apparent by reference to the drawings and by reading the detailed description that follows.

DETAILED DESCRIPTION OF THE INVENTION

In the following detailed description of exemplary embodiments of the present invention, reference is made to the accompanying drawings, which form a part hereof, and in which is shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the present invention may be practiced are described. In the second section, a system level overview of the present Invention is presented. In the third section, methods for an exemplary embodiment of the present invention are provided. In the fourth section, a particular HTML implementation of the present invention is described. Finally, in the fifth section, a conclusion of the detailed description is provided.

Hardware and Operating Environment

Figure 1:
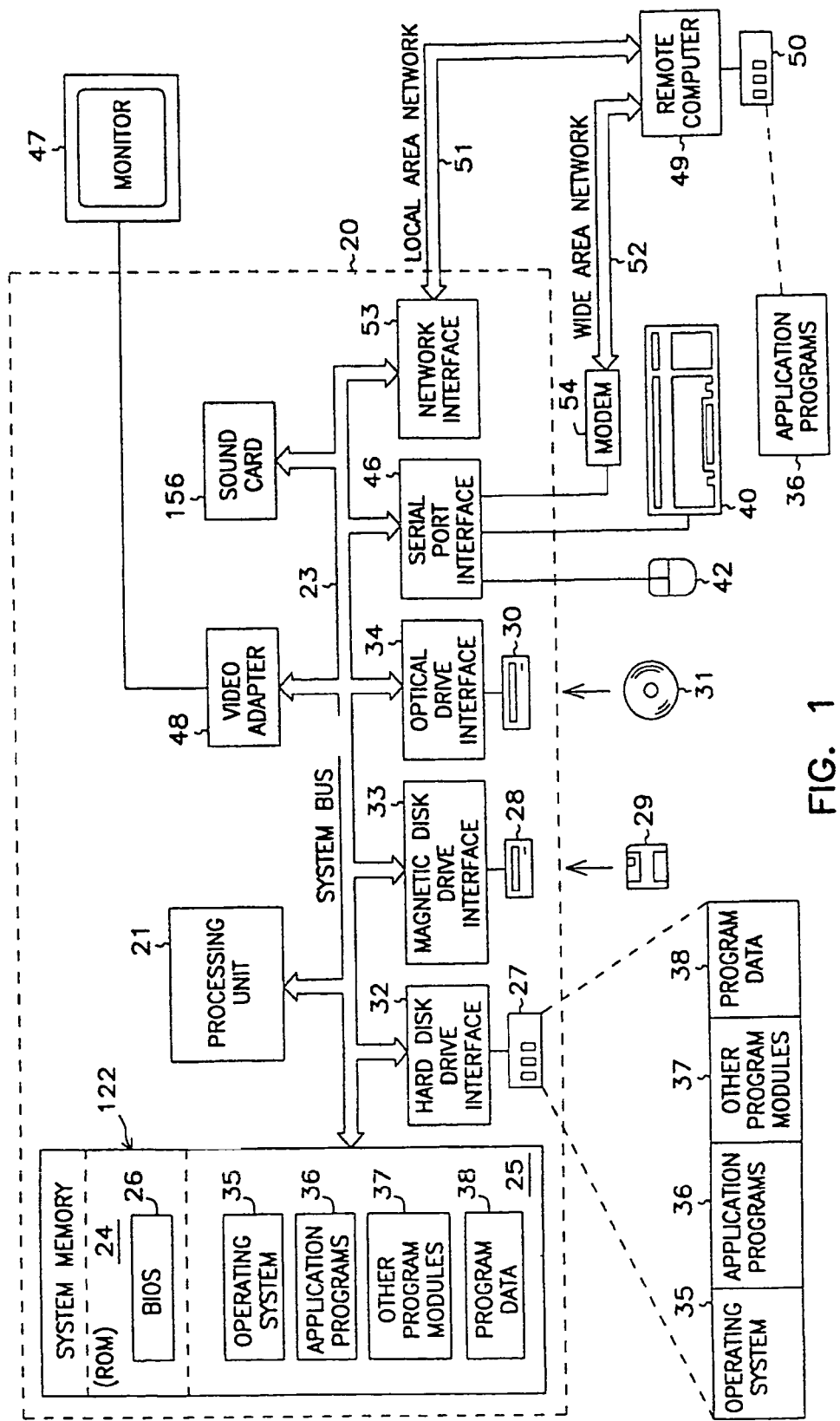
FIG. 1 shows a diagram of the hardware and operating environment in conjunction with which embodiments of the present invention may be practiced.

FIG. 1 is a diagram of the hardware and operating environment in conjunction with which embodiments of the present invention may be practiced. The description of FIG. 1 is intended to provide a brief, general description of suitable computer hardware and a suitable computing environment in conjunction with which the present invention may be implemented. Although not required, the present invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the present invention may be practiced with other computer system configurations, including hand-held devices, multiprocessor systems, microprocessor-based or programmable consumer electronics, network PCs, minicomputers, mainframe computers, and the like. The present invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the present invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the present invention is not so limited.

The system bus 23 may be any of several types of bus structures including a memory bus or memory controller, a peripheral bus, and a local bus using any of a variety of bus architectures. The system memory may also be referred ~o as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a bard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), mad the like, may be used ha the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the present invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Interact. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the present invention may be practiced has been described. The computer in conjunction with which embodiments of the present invention may be practiced may be a conventional computer, a distributed computer, or any other type of computer; the present invention is not so limited. Such a computer typically includes one or more processing u-nits as its processor, and a computer-readable medium such as a memory. The computer may also include a communications device such as a network adapter or a modem, so that it is able to communicatively couple other computers.

System Level Overview

A system level overview of the operation of an exemplary embodiment of the present invention is described by reference to FIG. 2, FIG. 3, FIG. 4, FIG. 5, and FIG. 6.

An image is manipulated or transformed Using raster operations from vector-based operations.

Figure 2:
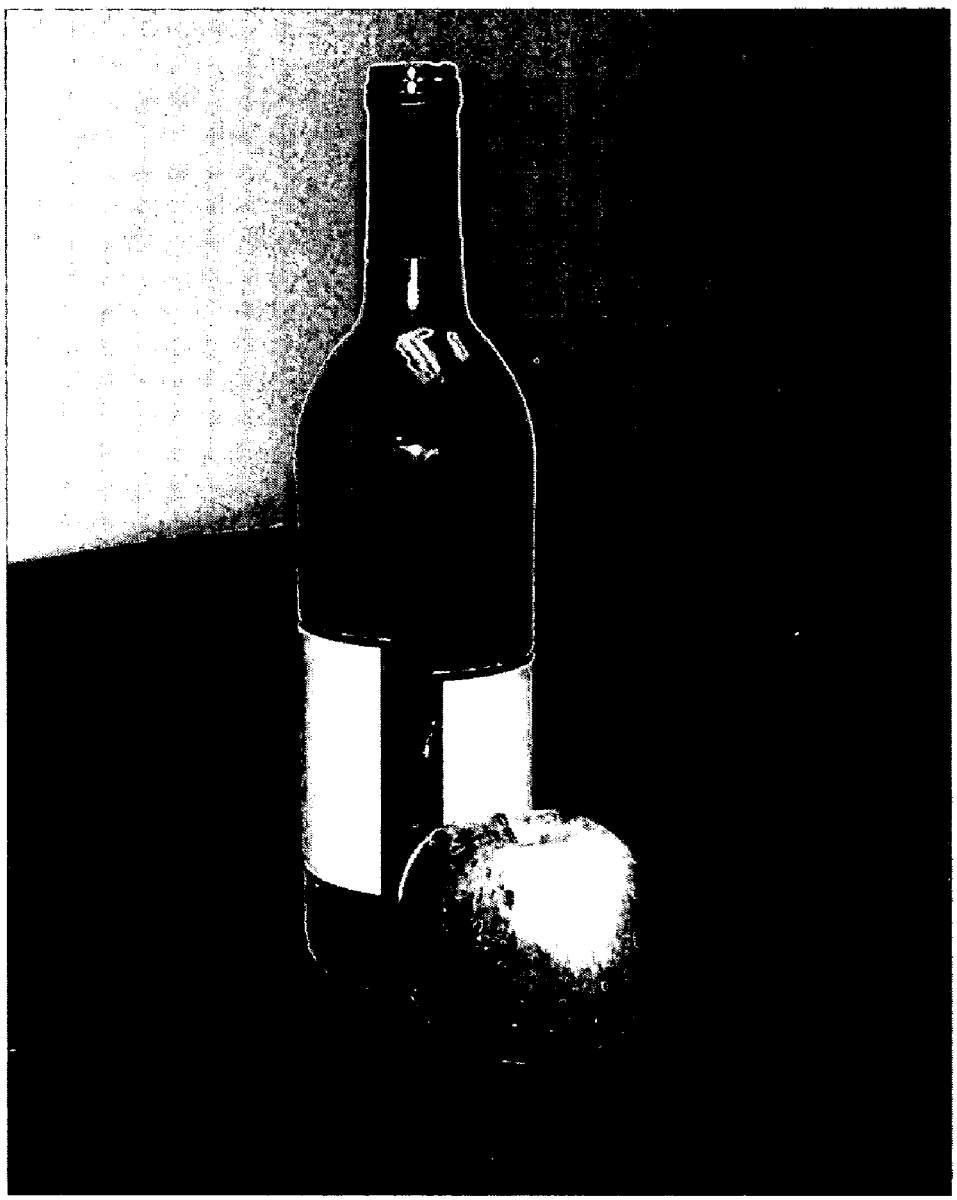
FIG. 2 is a diagram of an original image before transformation according an exemplary embodiment of the present invention.

FIG. 2 is a diagram of an original image 200 before transformation according an exemplary embodiment of the present invention.

Figure 3:
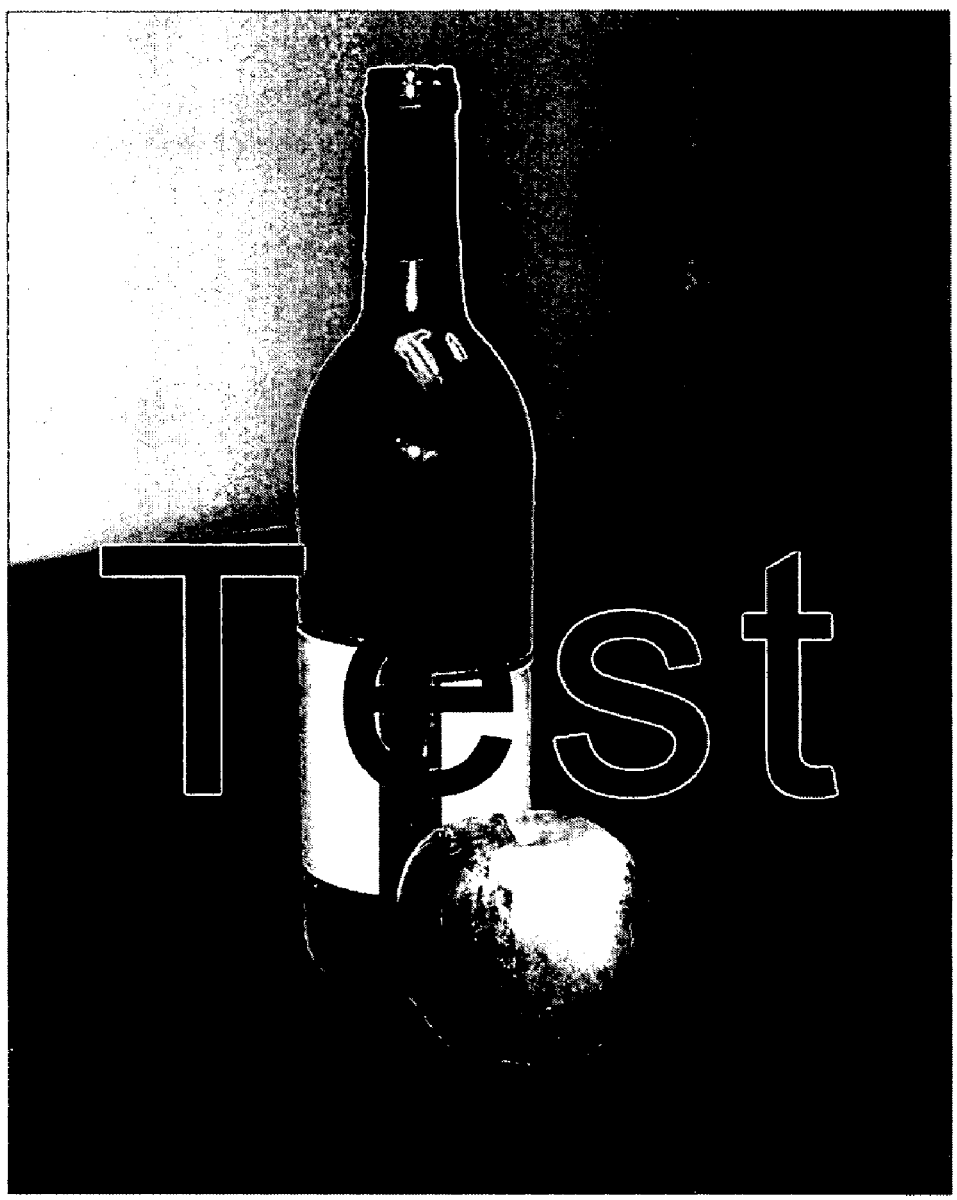
FIG. 3 is diagram of an original image with a vector text shape drama on top, according an exemplary embodiment of the present invention.

A shape is drawn from a vector description. FIG. 3 shows the original image with a vector-defined shape drawn on it. FIG. 3 is diagram of an original image 300 with a vector text shape drawn on top, according an exemplary embodiment of the present invention.

Figure 4:
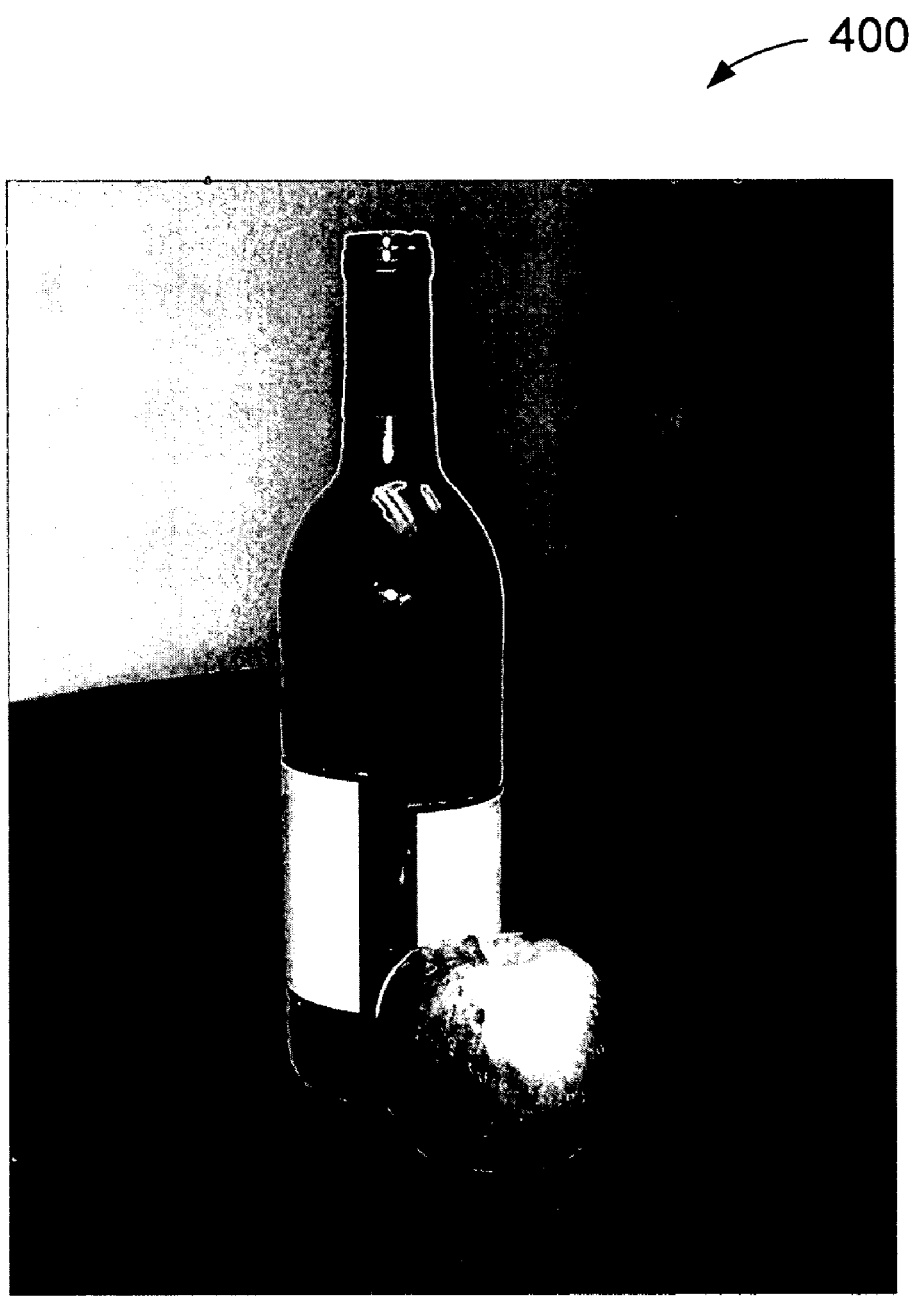
FIG. 4 is a diagram of an image with a vector shape drawn on top, in which the shape bits are replaced with the corresponding bits from the original image, according an exemplary embodiment of the present invention.

Thereafter, the bits in the original image, such as in FIG. 2, that are underneath, or corresponding to, the vector images, are retrieved from the original image. Then, the contents of the vector drawing are replaced with the retrieved bits from the image underneath as shown in FIG. 4. If the vector is drawn on the original image, the vector would be transparent because the vector contains the same pixels at the corresponding position. FIG. 4 is a diagram of an image with a vector shape drawn on top 400, in which the shape bits are replaced with the corresponding bits from the original image, according an exemplary embodiment of the present invention.

Figure 5:
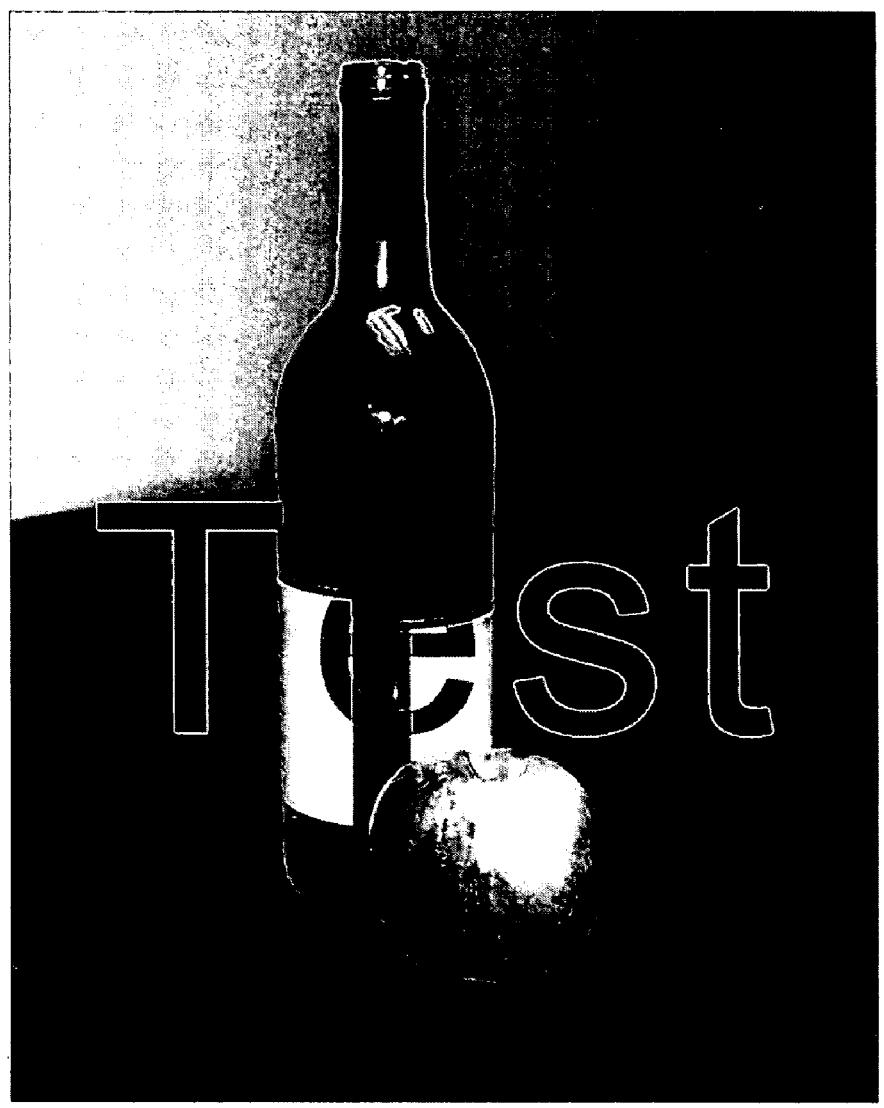
FIG. 5 is a diagram of an original image with a vector shape drawn on top, in which a darkening filter is applied to the region defined by the shape vector, according an exemplary embodiment of the present invention.

Later, a transformation or manipulation is applied to the image. For example, if a darken filter is applied, the shape is darkened. However, the shape appears similar to the image is underneath or corresponding to the shape, so when the filter is applied, it appears as if the image itself is darkened. More specifically, a copy of the shape portion of the original image 200 is made, that is then darkened, and then is drawn on top of the original image 200. FIG. 5 is a diagram of an original image with a vector shape drawn on top 500, in which a darkening filter is applied to the region defined by the shape vector, according an exemplary embodiment of the present invention.

Figure 6:
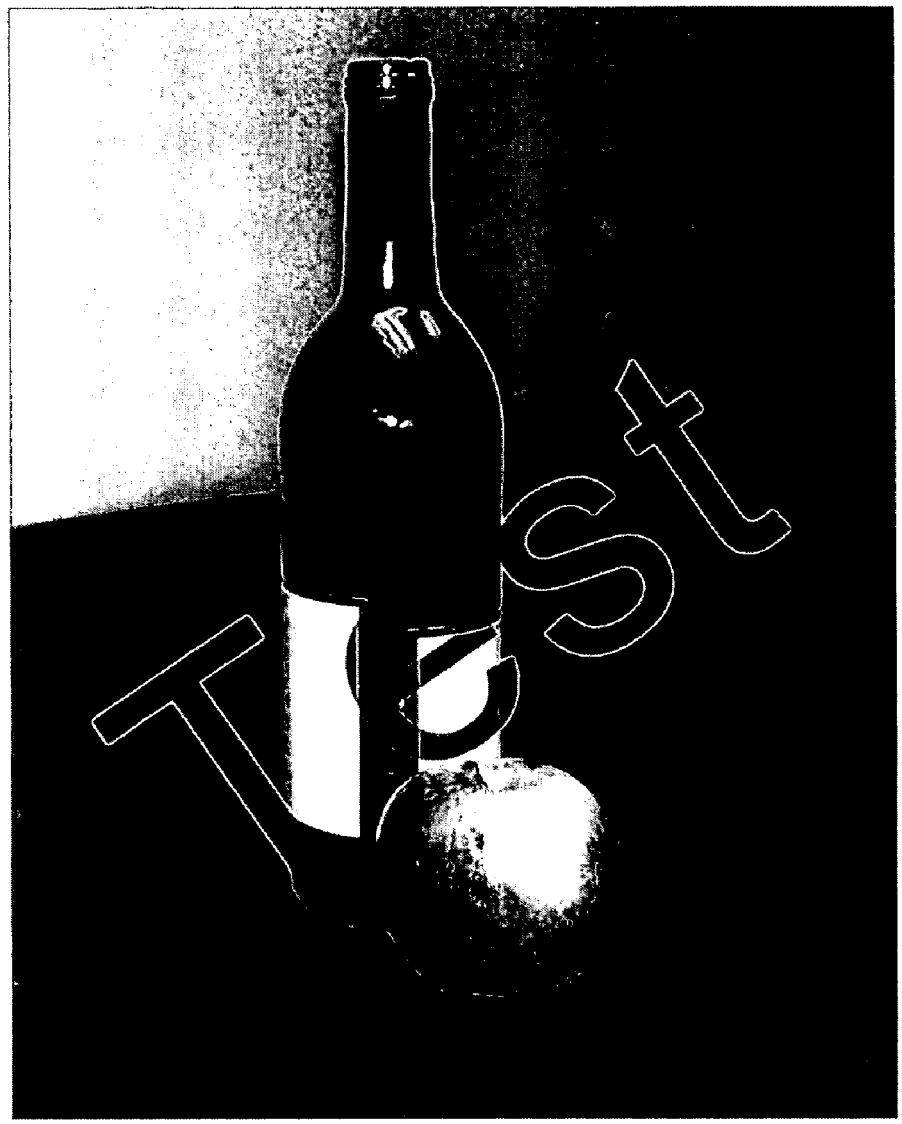
FIG. 6 is a diagram of an original image with a vector shape drawn on top, in which a manipulation is applied to the region defined by the shape vector, according an exemplary embodiment of the present invention.

After the vector shape is drawn, the shape can be manipulated again. For example, the size or location of the shape can be changed, or a different area of the screen will be darkened. FIG. 6 is a diagram of an original image with a vector shape drawn on top 600, in which a manipulation is applied to the region defined by the shape vector, according an exemplary embodiment of the present invention.

The system level overview of the operation of an exemplary embodiment of the present invention has been described in this section of the detailed description. The present invention provides raster-based manipulations of images from vector-based descriptions. While the present invention is not limited to any particular vector-based operations and/or manipulations, for sake of clarity, simplified operations and manipulations have been described.

Methods of an Exemplary Embodiment of the Present Invention

In the previous section, a system level overview of the operation of an exemplary embodiment of the present invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 7:
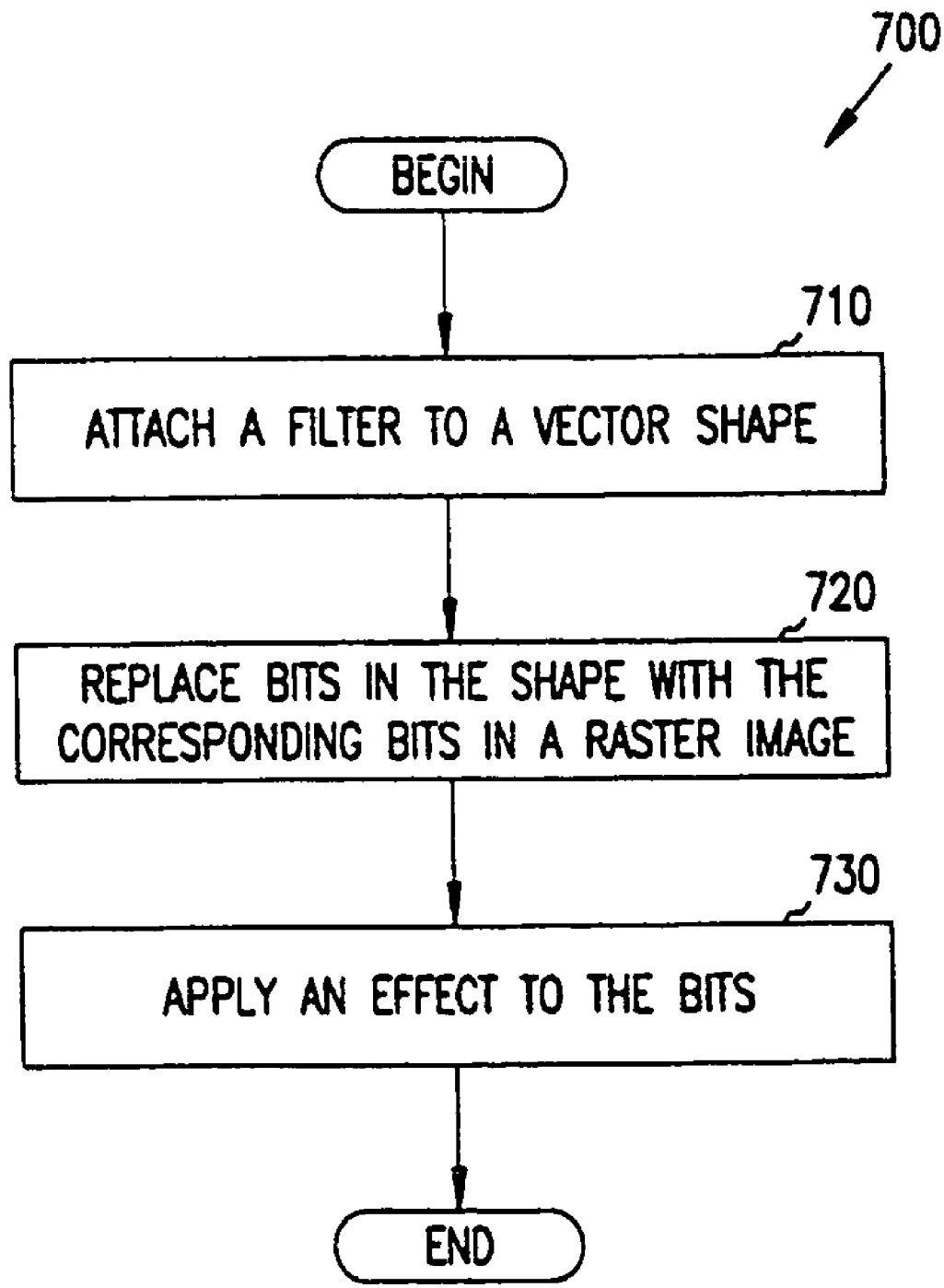
FIG. 7 is a flowchart of a method for image editing according to an exemplary embodiment of the present invention.

Referring next to FIG. 7, a flowchart of a method 700 for image editing according to an exemplary embodiment of the present invention is shown. This method is inclusive of the acts required to be taken by a display-language-renderer.

Method 700 includes attaching a filter to a textual vector instruction 710. The instruction describes a geometric shape, In one embodiment, the filter includes a transformation instruction. In another embodiment, the transformation operation further comprises an instruction implemented as an extension to a browser, such as a DirectX® Transform plug-in extension to a browser. In still another embodiment, the textual vector instruction further comprises a vector markup language instruction, such as an instruction in vector markup language (VML) or Scalable Vector Graphics (SVG).

Method 700 subsequently includes replacing the non-transparent bits defined by the textual vector instruction with the corresponding bits in a raster image 720. Method 700 thereafter includes applying an effect to the non-transparent bits 730. All raster transformation operations are defined in vector image drawing terms, therefore the entire set of raster operations are available through vector image operations. In one embodiment, a Microsoft® DirectX® Transform (DX-Transform) enables describing the region of manipulation in VML or SVG over which any arbitrary DXTransform is provided. Thus, drawing tools are enabled, such as the vector drawing tools in NetDocs that provide an authoring environment for generating VML shapes in NetDocs and enable drawing a vector shape on top of a bitmap. For example, where a shape including an arrow and text is specified to be drawn on top of the bitmap, a transform is applied to the region defined by the shape. If a darken filter is applied, then the part of the bitmap covered by the arrow and text would become darker.

In one embodiment of method 700, receiving the filter from a display-language-renderer (not shown) and receiving the raster image from a display-language-renderer (not shown) is performed before attaching a filter to a textual vector instruction 710. In varying embodiments, receiving the filter from a display-language-renderer is performed before, during or after receiving the raster image from a display-language-renderer. In another embodiment, the display-language-renderer is a browser, such as Microsoft Internet Explorer.

Figure 8:
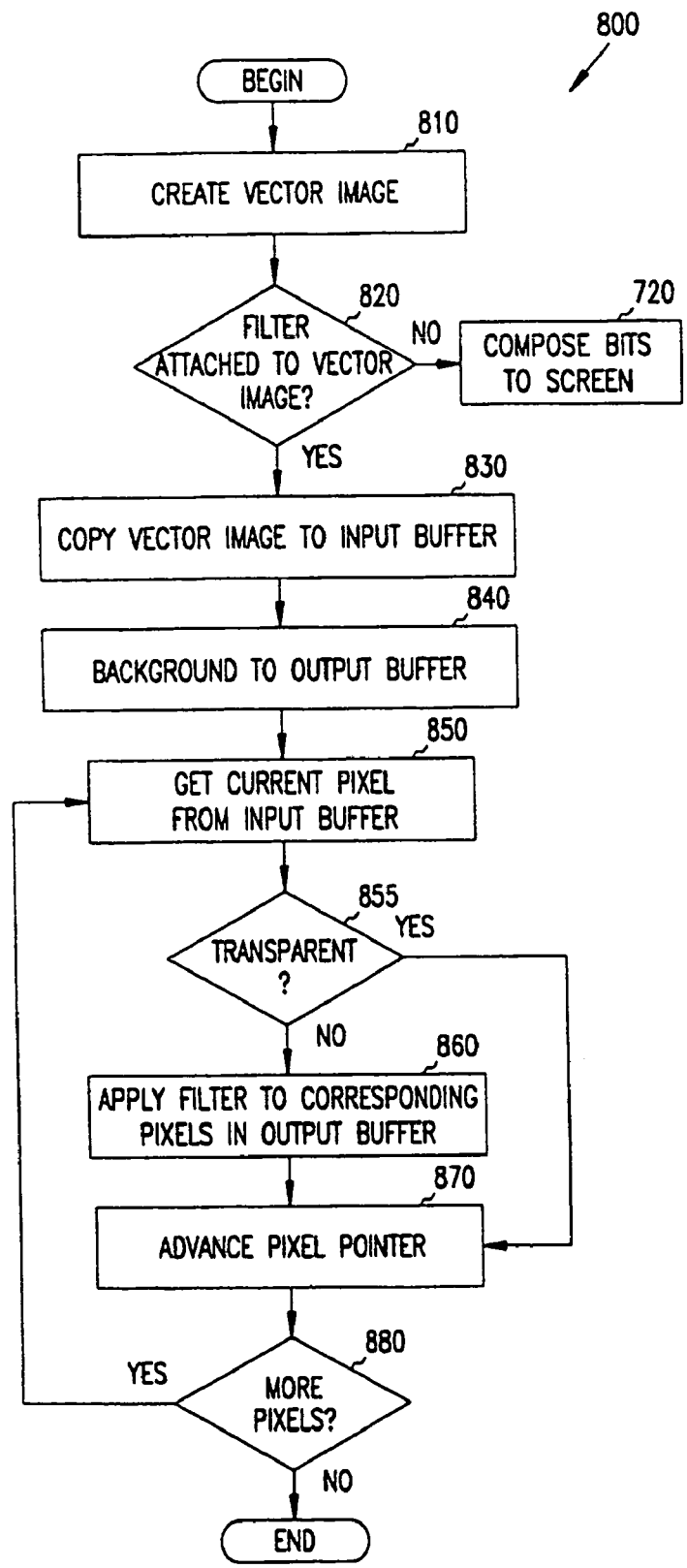
FIG. 8 is a flowchart of a method for image editing according to an exemplary embodiment of the present invention is shown.

Referring next to FIG. 8, a flowchart of a method 800 for image editing according to an exemplary embodiment of the present invention is shown. This method is inclusive of the acts required to be taken by a display-language-renderer and a component that provides image manipulations. In one embodiment, the display-language-renderer is a browser, such as Microsoft Interact Explorer and the component that provides image manipulations is a plug-in extension to the browser. In yet another embodiment where the component that provides image manipulations is a plug-in extension to the browser, the plug-in extension is a customized Microsoft® Direct.X® Transform method.

Method 800 includes creating a vector image from a vector-based shape description 810. In one embodiment, the vector-based shape description is a VML or SVG specification. Thereafter, method 800 includes determining that a filter is associated with the vector image 820. In one embodiment, the filter is a DirectX® Transform (DXTransform) application program interface (A.P.I.). In another embodiment, the filter is associated with the image by being attached to the image. In still another embodiment, the method includes composing bits to a screen buffer where the determining in action 820, fails.

Subsequently, method 800 includes copying the shape to an input buffer 830 and copying a background image to an output buffer 840. The background image as in original image 200 in FIG. 2. In varying embodiments, copying 830 is performed before, during, and/or after copying 840.

Thereafter, method 800 includes retrieving a pixel from the input buffer from a pixel pointer 850. The pixel pointer points to the current pixel of the shape in the input buffer. Initially, the pixel pointer points to the first pixel in the shape in the input buffer.

Subsequently, the filter is applied to the corresponding pixels in the output buffer 860. In one embodiment, applying the filter includes transforming the corresponding bit in the background image in the output buffer where the pixel is not transparent and/or invisible 855.

Thereafter, method 800 includes advancing the pixel pointer 870 and repeating the method 880, starting with retrieving 850 where there are more pixels in the shape in the input buffer.

In still another embodiment where the display-language-renderer is a browser and the component that provides image manipulations is a plug-in extension to the browser is a customized Microsoft® DirectX® Transform method, actions 810, 820, 830, and 840 are performed by the browser and actions 850, 855, 860, 870, 880, and 890 and performed by the customized Microsoft® DirectX® Transform method.

In still yet another embodiment, the filter is a filter in a chain of a plurality of filters and the method 800 is performed for each of the filters in the chain of plurality of filters.

In an alternative embodiment, method 900 described below, is perforated after action 880 and before action 890.

Figure 9:
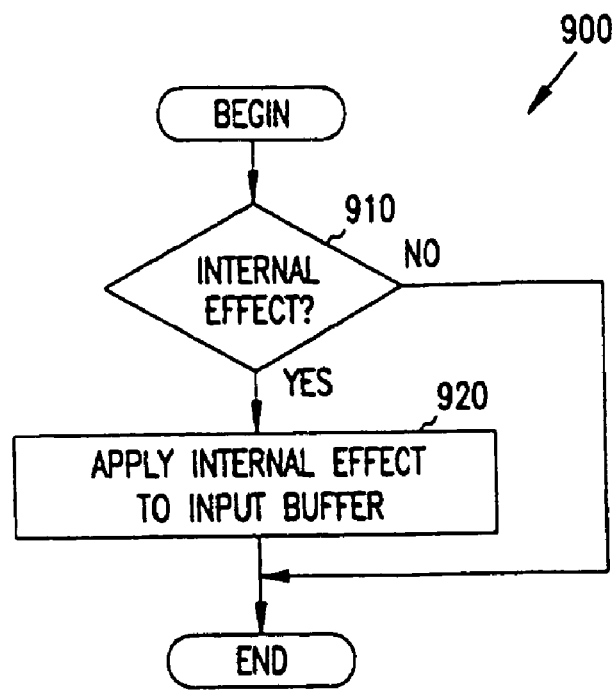
FIG. 9 is a flowchart of a method for image editing according to an exemplary embodiment of the present invention is shown.

Referring next to FIG. 9, a flowchart of a method 900 for image editing according to an exemplary embodiment of the present invention is shown. This method is inclusive of the acts required to be taken by a component that provides image manipulations. In one embodiment, the component that provides image manipulations is a plug-in extension to the browser. In another embodiment where the component that provides image manipulations is a plug-in extension to the browser, the ping-in extension is a customized Microsoft® DirectX® Transform method.

Method 900 includes determining that an internal effect is specified 910. Thereafter, the method includes applying the internal effect to the input buffer, in which the input buffer stores a shape.

Figure 10:
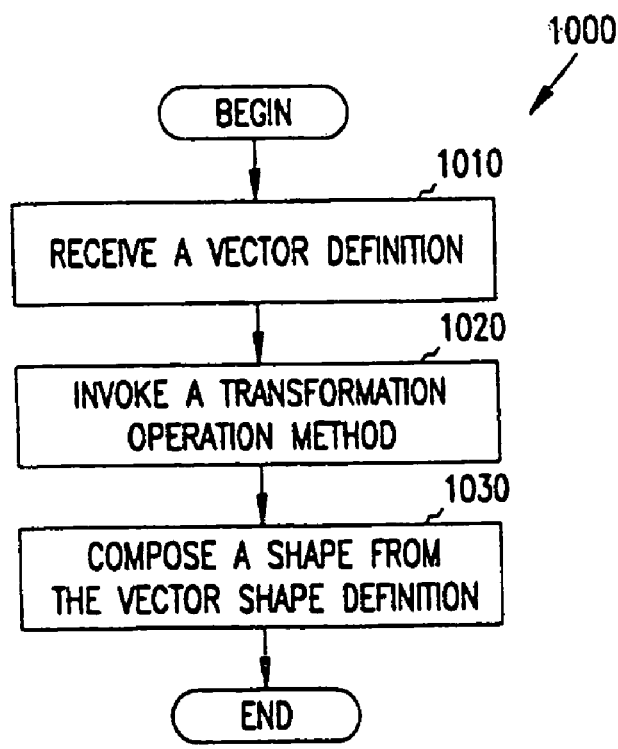
FIG. 10 is a flowchart of a method for image editing according to an exemplary embodiment of the present invention is shown.

Referring next to FIG. 10, a flowchart of a method 1000 for image editing according to an exemplary embodiment of the present invention is shown.

Method 1000 includes receiving a vector shape definition and/or description 1010, the definition being associated with a raster-based transformation. Thereafter, the method includes invoking a call to a method of a transformation operation that performs a raster-based transformation on the vector shape described by the definition 1020. In one embodiment, the transformation operation is implemented as an extension to a display language renderer, such as a browser. Subsequently, method 1000 includes composing a shape from the vector shape definition 1030.

Another method of image editing according to an exemplary embodiment of the present invention includes copying the data contained in an output buffer to a first temporary buffer. Subsequently, applying a non-custom DxtTransform to the first temporary buffer, yielding a second temporary buffer. Thereafter, identifying the non-transparent pixels in the input buffer. Subsequently, copying to the output buffer, the pixels in the second temporary buffer that correspond to the non-transparent pixels in the input buffer.

The particular methods performed by a computer of an exemplary embodiment of the present invention have been described.

HTML/Browser Implementation

In this section of the detailed description, a particular implementation of the present invention is described that in which the raster-based manipulation of a vector shape is implement in a call to a Microsoft® DirectX® Transform® method from a HTML page.

In one embodiment, the Transform method is a computer program comprised of computer readable instructions, stored on a computer-readable medium, that is accessible as an extension to a browser, that performs a raster-based manipulation of an image described in a text vector-based language.

In another embodiment, the Transform method is a computer program comprised of computer readable instructions, stored on a computer-readable medium, that is accessible as a service to provide special effects to a browser that describes a vector shape on top of a raster image. In yet another embodiment, the service is a plug-in extension.

In still another embodiment, the present invention is a HTM-L computer program comprised of computer readable instructions, stored on a computer-readable medium, that invokes a Transform method service that provides special effects to a browser by performing vector transformations of raster-images. In still yet another embodiment, the service is a ping-in extension.

Figure 11:
FIG. 11 is a table of an HTML program that invokes a VML or SVG method, according an exemplary embodiment of the present invention.

Referring next to FIG. 11, a table of an HTML program 1100 that invokes a vector markup language (VML) or Scalable Vector Graphics (SVG) method, according an exemplary embodiment of the present invention is shown.

Line 1110 invokes the HTML interpreter in the browser and attaches the VML DirectX® Transform component as a service. Line 1120 associates the "V:\" with the VML process that is attached in line 1110. Line 1130 identifies the raster image of which vector-based manipulations will be described. Line 1140 invokes the DirectX® Transform component, providing a number of manipulations to the raster image described in vector-based terms.

Figure 12:
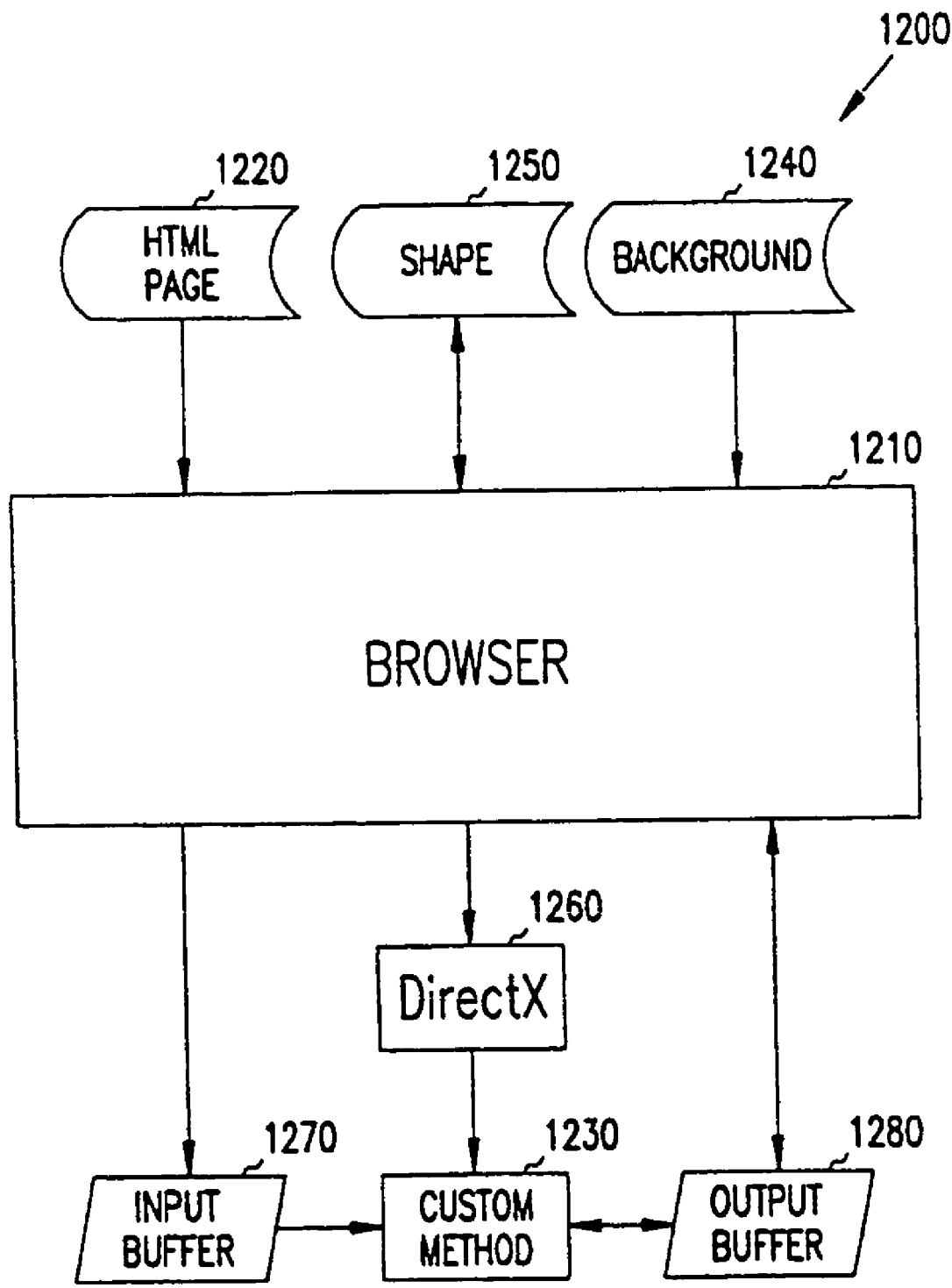
FIG. 12 is a block diagram of an apparatus 1200 that performs raster manipulations of a vector-defined shape, according an exemplary embodiment of the present invention.

Referring next to FIG. 12, a block diagram of an apparatus 1200 that performs raster manipulations of a vector-defined shape, according an exemplary embodiment of the present invention.

Apparatus includes a display-language-renderer 1210, such as browser, that receives a HTML page 1220, the HTML page identifying a custom extension method 1230 to the browser. In one embodiment, a browser is Microsoft® Internet® Explorer®. Browser 1210 also receives a background image 1240, a vector shape 1250, and a vector manipulation (not shown).

Apparatus 1200 also includes a component 1260 that is operably coupled through a communication link, such as an application program interface (API), to the browser 1210. The component 1260 is also operably coupled to the custom extension method 1230 through a communication link, such as an application program interface (API).

Apparatus 1200 also includes an input buffer 1270 that is operably coupled to the browser through a communication link, such as an application program interface (API). Furthermore, input buffer 1270 is operably coupled to the custom method 1230 through a communication link, such as an application program interface (API).

Apparatus 1200 also includes an output buffer 1280 that is operably coupled to the browser through a communication link, such as an application program interface (API). Furthermore, output buffer 1280 is operably coupled to the custom method 1230 through a communication link, such as an application program interface (API).

The browser 1210 generates the vector shape 1250 from a vector description (not shown) in the HTML page 1220, copies the vector shape 1250 to the input buffer 1270, copies the background 1240 to the output buffer 1280.

Thereafter, the custom method 1230 copies bits in the output buffer 1280, that correspond with bits in the input buffer 1270, to the input buffer 1270. The custom method later applies the vector manipulations to the input buffer 1270, and copies the input buffer 1270 to the output buffer 1280.

The browser 1210 displays the output buffer 1280.

CONCLUSION

A system and method of providing raster manipulation of images from vector-based descriptions has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that any extension for a display-language-renderer, such as Microsoft® DirectX® Transform, Adobe PhotoShop® Plug-in® and Adobe® Premiere® filter fulfills the function of creating effects and manipulating images in a display-language-renderer.

More specifically, in computer-readable program embodiments of system 200 and apparatus 1200, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 120 in FIG. 1, or on at least as many computers as there are components.

The present invention is a system and method of supporting all raster-based image manipulations described in vector-based terms. The present invention has the benefits of providing clean transformation that vector-based manipulations yields, and providing a broad selection of all image transformation operations that raster-based manipulations yields. In one aspect of the invention a vector-defined shape is drawn on top of a raster-based image by replacing the contents of the vector image with the bits from the raster image. In another aspect of the present invention, a copy of the portion of the raster image that overlaps with the vector-defined portion is made, the transformation operation is performed on the copy, and then the portion of the raster image is replaced with the transformed copy, In yet another aspect of the present invention, a filter, such as a transformation operation, is attached to a textual vector instruction, the bits defined by the textual vector instruction are replaced with the corresponding bits in a raster image, and the transformation is applied. In still another aspect of the present invention, a browser receives a HTML page, in which the HTML page identifies a custom plug-in extension method to the browser, a background image, a vector shape, and a raster manipulation, the browser communicates the information in the HTML page to the custom plug-in extension component, and the component uses an input buffer, and an output buffer coupled to the browser to perform the raster manipulation on the vector shape and background image.

The terminology used in this application with respect to is meant to include all communications links, browsers, browser extensions, and graphic environments. Therefore, it is manifestly intended that this invention be limited only by the following claims and equivalents thereof.

We claim:

1. One or more computer-readable media comprising computer-executable instructions for image editing, the computer-executable instructions comprising instructions for:
   creating a vector image from a specification;
   determining that a filter is associated with the vector image;
   copying the vector image to an input buffer;
   copying a background image to an output buffer, wherein the background image is a raster image;
   retrieving a pixel from the input buffer as indicated by a pixel pointer;
   applying the filter to a corresponding pixel in the output buffer where the pixel is not transparent;
   advancing the pixel pointer; and
   repeating the computerized method starting with the retrieving wherein a further pixel is moved into the input buffer.

2. The one or more computer-readable media of claim 1, wherein the determining that the filter is associated with the vector image comprises instructions for determining that the filter is attached to the vector image.

3. The one or more computer-readable media of claim 1, wherein the specification comprises a vector markup language specification.

4. The one or more computer-readable media of claim 1, wherein the specification comprises scalable vector graphics specification.

5. The one or more computer-readable media of claim 1, wherein the specification comprises a vector markup language specification and a scalable vector graphics specification.

6. The one or more computer-readable media of claim 1, wherein the instructions implement a standard display-language-renderer.

7. The one or more computer-readable media of claim 6, wherein the standard display-language-renderer comprises a browser.

8. The one or more computer-readable media of claim 1, further comprising instructions for:
   determining that an internal effect is specified; and
   applying the internal effect to the input buffer.

9. The one or more computer-readable media of claim 1, further comprising instructions for:
   composing bits to a screen buffer when the determining that the filter is associated with the vector image fails.

10. The one or more computer-readable media of claim 1, wherein the instructions perform copying the vector image to the input buffer are performed after instructions copying the background image to the output buffer.

11. A method to edit images comprising:
   generating a vector shape from a vector description in a hyper text markup language page;
   copying the vector shape to an input buffer;
   copying a background to an output buffer, wherein the background is raster image;
   copying a portion of the output buffer corresponding with the input buffer to the input buffer;
   applying vector manipulations to the input buffer;
   copying the input buffer to the output buffer; and
   displaying the output buffer.

12. The method of claim 11, wherein copying the portion of the output buffer, applying vector manipulations and copying the input buffer to the output buffer are performed by a plug-in extension to a browser.

13. A system configured for image editing, the system comprising:
   means for creating a vector image from a specification;
   means for determining that a filter is associated with the vector image;
   means for copying the vector image to an input buffer;
   means for copying a background image to an output buffer wherein the background is raster image;
   means for retrieving a pixel from the input buffer as indicated by a pixel pointer;
   means for applying the filter to a corresponding pixel in the output buffer where the pixel is not transparent;
   means for advancing the pixel pointer; and
   means for repeating the computerized method starting with the retrieving wherein a further pixel is moved into the input buffer.

14. The system of claim 13, wherein the means for determining that the filter is associated with the vector image comprises determines that the filter is attached to the vector image.

15. The system of claim 13, wherein the specification comprises a vector markup language specification.

16. The system of claim 13, wherein the specification comprises scalable vector graphics specification.

17. The system of claim 13, wherein the specification comprises a vector markup language specification and a scalable vector graphics specification.

18. The system of claim 13, further comprising:
   means for determining that an internal effect is specified; and
   means for applying the internal effect to the input buffer.

19. The system of claim 13, further comprising:
   means for composing bits to a screen buffer when the means for determining that the filter is associated with the vector image fails.

20. The system of claim 13, wherein the means for copying the vector image to the input buffer operate after the means for copying the background image to the output buffer.

* * * * *

UNITED STATES PATENT AND TRADEMARK OFFICE
CERTIFICATE OF CORRECTION

PATENT NO. : 6,995,777 B2
APPLICATION NO. : 11/009736
DATED : February 7, 2006
INVENTOR(S) : Sanborn et al.

It is certified that error appears in the above-identified patent and that said Letters Patent is hereby corrected as shown below:

On the title page, item (76), in "Inventors", in column 1, line 3, after "Hyman," delete "5206" and insert -- 5469 --, therefor.

In column 1, line 6, delete "copending" and insert -- a --, therefor.

In column 1, line 7, delete "May 31" and insert -- June 15 --, therefor.

In column 1, line 7, after "2000" insert -- , and issued July 6, 2004, as U.S. patent 6,760,885, --, therefor.

In column 1, line 10, after "FOR" insert -- VIDEO --.

In column 8, line 63, delete "," and insert -- . --, therefor.

In column 14, line 6, in Claim 11, after "is" insert -- a --.

In column 14, line 23, in Claim 13, after "buffer" insert -- , --.

In column 14, line 24, in Claim 13, after "background" insert -- image --.

In column 14, line 24, in Claim 13, after "is" insert -- a --.

Signed and Sealed this

Twenty-third Day of March, 2010

David J. Kappos
*Director of the United States Patent and Trademark Office*